US 7,703,681 B2

(12) United States Patent
Lee et al.

(10) Patent No.: US 7,703,681 B2
(45) Date of Patent: Apr. 27, 2010

(54) ELECTRONIC TICKET MANAGEMENT SYSTEM

(76) Inventors: Shao-Hsuan Lee, No. 43, Lane 70, Yunji St., Wuci Township, Taichung County (TW); Ying-Chun Chen, 3F-6, No. 86, Jhongcing W. St., Dafu Village, Situn Dist., Taichung City (TW); Li-Wei Li, No. 10, Jhongyi St., Jioushe Village, Dounan Township, Yunlin County (TW)

( * ) Notice: Subject to any disclaimer, the term of this patent is extended or adjusted under 35 U.S.C. 154(b) by 226 days.

(21) Appl. No.: 11/724,269

(22) Filed: Mar. 15, 2007

(65) Prior Publication Data
US 2008/0223940 A1   Sep. 18, 2008

(51) Int. Cl.
G06K 7/10 (2006.01)
G06K 17/00 (2006.01)
G06K 19/00 (2006.01)
G06Q 10/00 (2006.01)

(52) U.S. Cl. .................. 235/462.01; 235/375; 235/382; 235/383; 235/487; 705/5

(58) Field of Classification Search ................. 235/375, 235/382, 383, 462.01, 487; 705/5
See application file for complete search history.

(56) References Cited

U.S. PATENT DOCUMENTS

| | | | | |
|---|---|---|---|---|
| 5,754,654 A * | 5/1998 | Hiroya et al. | ................. | 705/76 |
| 7,194,417 B1 * | 3/2007 | Jones | ............................ | 705/5 |
| 7,400,932 B2 * | 7/2008 | Ackley et al. | .................. | 700/17 |
| 7,536,307 B2 * | 5/2009 | Barnes et al. | ................... | 705/1 |
| 2001/0054010 A1 * | 12/2001 | Bernabeo et al. | .............. | 705/26 |
| 2002/0169623 A1 * | 11/2002 | Call et al. | ....................... | 705/1 |
| 2003/0055787 A1 * | 3/2003 | Fujii | ........................... | 705/44 |
| 2003/0066883 A1 * | 4/2003 | Yu | ............................... | 235/382 |
| 2004/0054592 A1 * | 3/2004 | Hernblad | ...................... | 705/15 |
| 2006/0218052 A1 * | 9/2006 | Haynes et al. | ................ | 705/26 |

* cited by examiner

*Primary Examiner*—Thien M. Le
*Assistant Examiner*—Tuyen K Vo
(74) *Attorney, Agent, or Firm*—Muncy, Geissler, Olds & Lowe, PLLC

(57) ABSTRACT

An electronic ticket management system mainly includes a vendor module, a ticket process module, a Web module, a ticket order module, a delivery module and a ticket verification module. After a consumer has purchased a ticket through a communication network, a service center transmits the information of the electronic ticket to a designated mobile communication device equipped with graphic display capability. When in use the consumer displays bar code graphics of the electronic ticket. Through a scanner at a ticket verification end the graphics of the electronic ticket on the mobile communication device can be captured, and identification result is verified online. Thus the total process does not have physical contact. The risk of carrying the currency can be prevented. The costs of manual operation and paper ticket can be saved. Therefore ticket processing efficiency increases.

9 Claims, 3 Drawing Sheets

ELECTRONIC TICKET MANAGEMENT SYSTEM

FIELD OF THE INVENTION

The present invention relates to an electronic ticket management system and particularly to a system adaptable to various types of electronic tickets that has a scanner at a ticket verification end to capture bar code graphics of the electronic tickets on a mobile communication device to prevent the risk of physically carrying the currency and save the costs of manual operation and paper tickets and improve ticket processing efficiency.

BACKGROUND OF THE INVENTION

Because of advance of technology nowadays many ticket purchase and commercial promotion activities are ordered or participated through telephone and Internet. Many users increasingly rely on the newest technologic means to resolve the ticket problem, such as for events that require to buy tickets in advance and verify the tickets for admission like cinemas, concerts, theaters, exhibitions, sport tournaments, theme parks, long distance transportation, etc. These new tools can even become authorizing means for any specific business promotional activity. Many users discover that the technology of electronic tickets provides great convenience.

While the present electronic ticket system can resolve the trouble of buying tickets onsite and save time, it still requires users to carry identification proof to take the physical tickets or coupons. Or the users have to print in advance related certificates to exchange the physical tickets or coupons. Some even require the users to directly print the authorized tickets or coupons. Some of the coupons have to be printed in colors to restrict the users from making a great amount of copies.

The approach set forth above that requires the users to take the physical tickets or print the authorized tickets creates a lot of problems, such as the tickets could be lost, forged or replicated. To keep the paper tickets is an out-of-date and low efficiency activity. It still exists today and does not have much improvement even though the technology has great progress.

Not fully paperless is a shortcoming of the conventional electronic ticket. This incurs many disadvantages previously discussed. It still leaves a lot to be desired. There are still rooms for improvement.

SUMMARY OF THE INVENTION

The primary object of the present invention is to provide an electronic ticket management system that uses an electronic ticket as a means of payment and certification. The electronic ticket is transmitted wirelessly through messages. The ticket owner does not have to go onsite to take the ticket. A mobile communication device such as handset or PDA or the like can receive a graphic file of the electronic ticket. When in use the mobile communication device displays the graphic file to be scanned by a scanner. Thus there is not physical contact in the whole process. The risk of physically carrying the currency is eliminated and the costs of manual operation and paper tickets can be saved. As a result ticket processing efficiency is higher.

To achieve the foregoing object, the electronic ticket management system of the invention includes a vendor module to allow business owners to register information of electronic tickets, including executing confirmation of account numbers and passwords of the business owners before registration is permitted, a ticket process module to generate newly added related data and electronic ticket content according to the information of the vendor module in a total database, a Web module to allow the business owners to perform service register and management of the electronic tickets through a network, and allow consumers to perform register, order and management of the electronic tickets through the network. The Web module includes at least activity information, activity period, ticket number, and bulletin board Website links registered by the business owners. Moreover, for charged electronic tickets the Web module checks and confirms the validity of the payment account numbers and passwords of the consumers before providing the selected content required by the consumers. The electronic ticket management system also includes a ticket order module to receive the information of the Web module, and through the ticket process module to generate and store preset electronic ticket content and bar code graphics in the total database, the bar code graphics may be two dimensions or three dimensions; and a delivery module which is connected to the total database through the ticket process module to send the content of the electronic tickets and bar code graphics to designated devices capable of displaying graphics through a telecommunication service center, such as mobile communication devices or computer display devices. After the electronic tickets have been transmitted by the delivery module to the mobile communication devices or mobile communication devices equipped with image capturing function designated by the consumers, the bar code graphics on the Web page shown on the display devices are recognized and captured. A ticket verification module also is included in the system that identifies the content of the electronic tickets on the mobile communication devices at a ticket verification end. The identified result is checked with the total database online.

The ticket verification module captures the bar code graphics of the electronic tickets on the mobile communication devices through a scanner at the ticket verification end. The identified result is checked with the total database online. The ticket verification end may include a sub-database to exchange with the total database for the required data. After the scanner has captured the bar code graphics on the mobile communication devices, validity certification can be done onsite locally. Moreover, the scanner may further be linked to a decryption input device to prevent the electronic tickets from being replicated or pilfered.

To prevent the electronic tickets from being replicated, the delivery module sends a reminding message regard the certified electronic tickets through the telecommunication service center to the mobile communication devices designated by the consumers.

The foregoing, as well as additional objects, features and advantages of the invention will be more readily apparent from the following detailed description, which proceeds with reference to the accompanying drawings. The embodiment discussed below serves only illustrative purpose, and is not the limitation of the invention.

DETAILED DESCRIPTION OF THE PREFERRED EMBODIMENT

Figure 1:
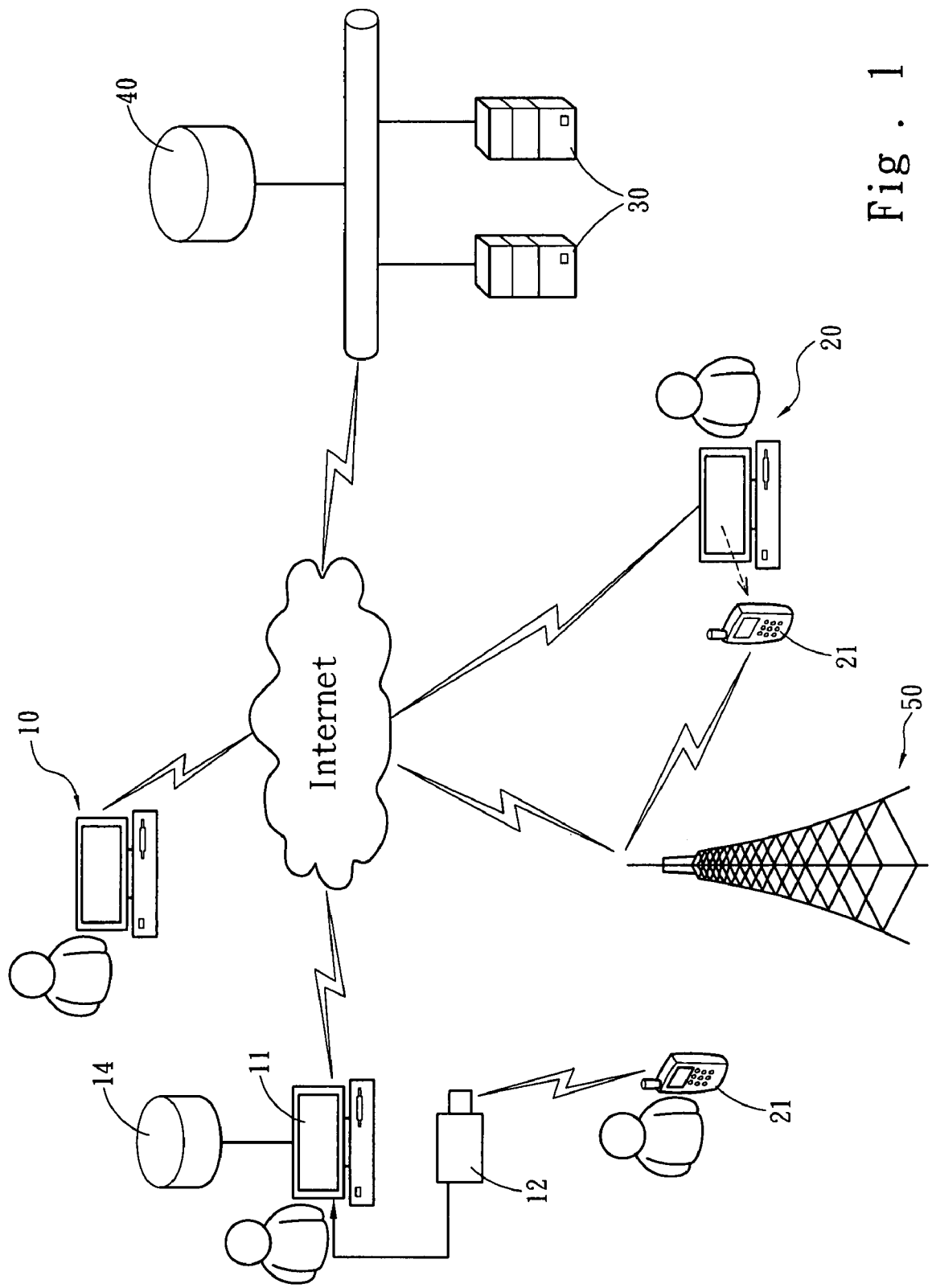
FIG. 1 is a schematic view of the apparatus of the electronic ticket management system of the invention.
Figure 2:
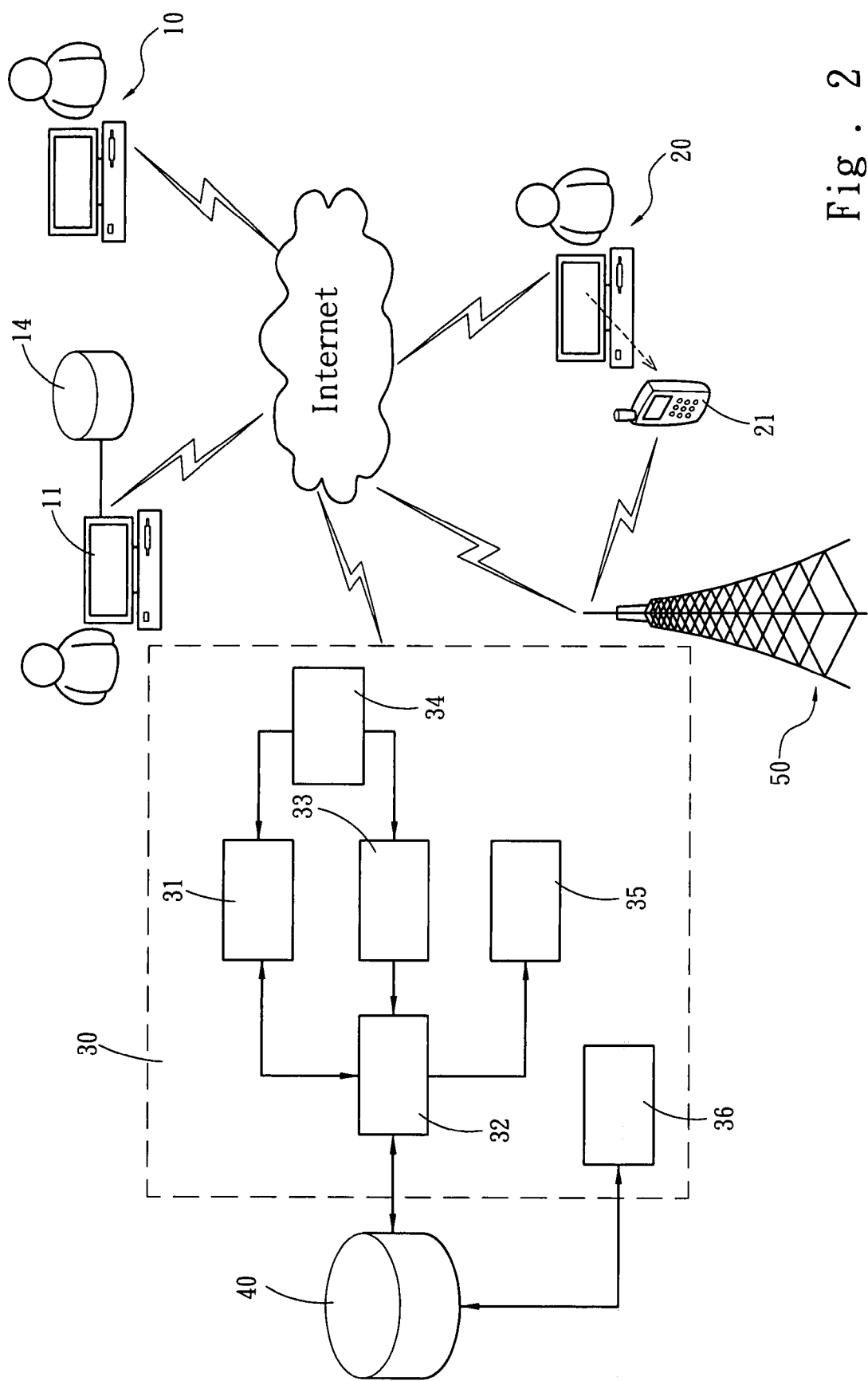
FIG. 2 is a schematic view of the module architecture of the electronic ticket management system of the invention.

Please referring to FIGS. 1 and 2, the electronic ticket management system according to the invention mainly includes a set of application servers 30 at an electronic ticket service center that contain all required modules, including a vendor module 31, a ticket process module 32, a Web module 34, a ticket order module 33, a delivery module 35 and a ticket verification module 36.

The vendor module 31 allows a business owner 10 to register information of electronic tickets, such as activity information, activity period, free or charged, ticket number, bulletin board Website link and the like. It also includes executing the account number and password confirmation of the business owner 10. After confirmed, the business owner 10 is permitted to perform the register and management set forth above.

The ticket process module 32 generates ticket related data and electronic ticket content in a total database 40 according to the newly added information of the vendor module 31.

The Web module 34 allows the business owner 10 to perform electronic ticket register service and management through a network. Through the function of the vendor module 31 the business owner 10 allows a consumer 20 to perform register, order process and management of the electronic tickets through the network. The Web module 34 displays at least activity information, activity period, ticket number, bulletin board Website link registered by the business owner 10, and management information of the tickets ordered by the consumer 20 in a user mode, such as historical data, add/return tickets and the like. For the charged electronic tickets, the Web module 34 provides the Web page of order content selected by the consumer 20 only after the validity of payment account number and password have been verified and confirmed The ticket order module 33 aims to receive the information of the Web module 34 and transfer necessary information to the ticket process module 32 to generate and store the preset electronic ticket content and bar code graphics in the total database 40. The bar code graphics may be either two dimensions or three dimensions.

The delivery module 35 is connected to the total database 40 through the ticket process module 32 to send the content of the electronic ticket graphic required by the consumer 20 to a device capable of display graphics designated by the consumer 20 through a telecommunication service center 50, such as a mobile communication device 21 like a handset or PDA equipped with GSM/GPRS/3G communication function, or a computer display device. The content and graphics of the electronic ticket can be transmitted from the delivery module 35 to the mobile communication device 21 or computer designated by the consumer 20. The Web page on the computer display device may be captured by an image capturing device included in the mobile communication device 21. The bar code graphics on the Web page of the display device may also be identified and captured, including electronic ticket content, so that the consumer 20 can identify the subject of the content of the bar code graphics.

The ticket verification module 36 aims to identify the bar code graphics on the mobile communication device 21 when it is presented by the consumer 20 at a ticket verification end 11. The identification result is verified online with the total database 40. The ticket verification end 11 may be any occasion that requires purchasing tickets in advance and admission by tickets, such as cinemas, concerts, theaters, exhibitions, sport tournaments, theme parks, long distance transportation, etc. It also can be a supermarket or the like to authenticate a specific commercial promotion activity.

Figure 3:
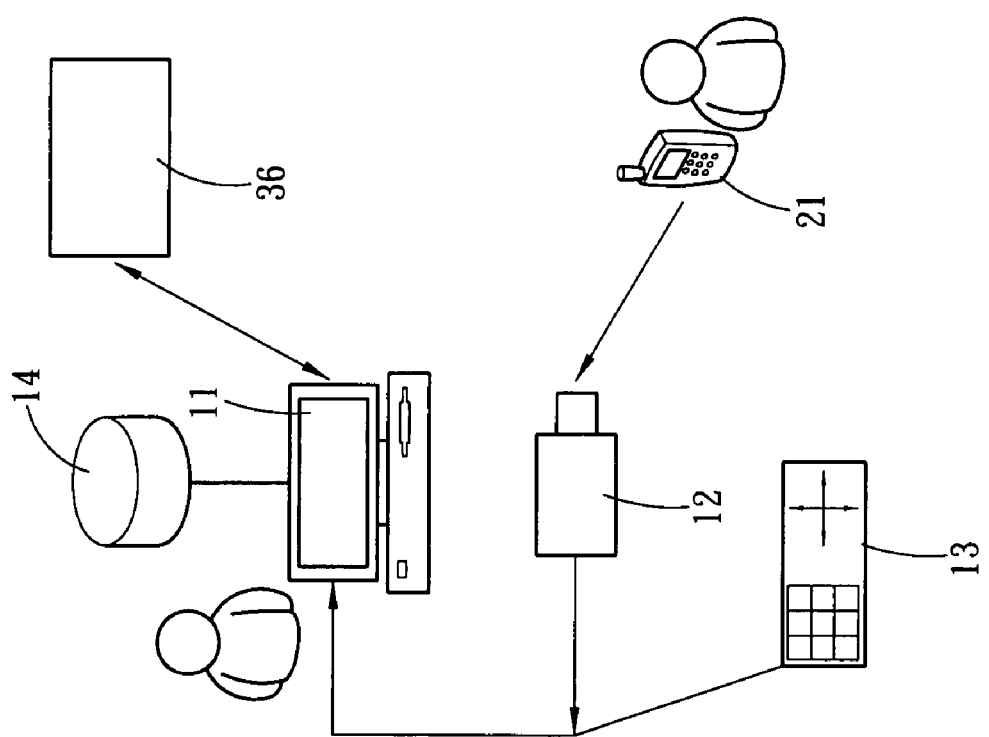
FIG. 3 is a schematic view of the electronic ticket management system of the invention in a use mode.

Refer to FIG. 3 for a schematic view of the electronic ticket of the invention in a use mode. At the ticket verification end 11 a scanner 12 is provided to capture the bar code graphics (two dimensions or three dimensions) on the mobile communication device 21; the identified result is verified online with the total database 40; after confirmed online, admission is granted or the electronic ticket serves as a voucher of related activities. The ticket verification end 11 may also include a sub-database 14 to exchange with the total database 40 for the necessary data required at the ticket verification end 11. After the scanner 12 has captured the bar code graphics on the mobile communication device 21, the verification can be done locally. Thereby the whole process does not require paper tickets. Through the popularity and convenience of the mobile communication device 21 physical contact can be dispensed with in management. The risk of carrying currency can be eliminated. The costs of manual process and paper tickets can be saved. Ticket processing efficiency is higher. The consumer 20 also does not have to go onsite to take the physical tickets or coupons. The cost of printing the authorized tickets or coupons also can be saved.

Moreover, the scanner 12 may also be connected to a decryption input device 13 to prevent the electronic ticket from being replicated or pilfered. At the ticket order time the consumer 20 is allowed to set a password. Only through the decryption input device 13 the scanner 12 can read the two-dimension bar code of the electronic ticket on the mobile communication device 21.

In addition, to prevent the electronic ticket from being replicated, a message may be sent by the delivery module 35 and transmitted to the mobile communication device 21 designated by the consumer 20 through the telecommunication service center 50 to remind the consumer 20 to do verification for the certified electronic ticket.

The invention is a management system that uses electronic tickets as the basis of payment and certification. The electronic tickets are transmitted wirelessly through messages without people to fetch physically. The code graphics of the electronic tickets are received through the mobile communication devices such as handsets or PDAs by scanning the displayed graphic files through a scanner. The system has the following advantages:

The invention provides electronic tickets to replace the conventional paper tickets. The whole process does not need physical contact. Thus the risk of carrying the currency can be eliminated, and the costs of manual operation and paper tickets can be saved. As a result, ticket processing efficiency increases.

The invention also likes the general electronic ticket that does not require consumers to take the ticket onsite. Business owners also do not have to mail the physical paper tickets. By means of a wireless means the bar code graphics such as two or three dimension bar codes can be transmitted as messages to mobile communication devices such as handsets or PDAs. When in use the bar code graphics can be displayed on the mobile communication devices to be scanned by a scanner. Through a ticket verification mechanism the problem of forging and replication of paper tickets also can be prevented. Thus it allows the business owners and consumers to enjoy great convenience brought by the advance of technology.

When the invention is in use for the charged tickets or coupons it can be cooperated with the existing ordinary scanners. As the two-dimension bar code is a well developed data capturing method, implementation of the invention does not require special capturing device. Hence implementation cost and time can be greatly reduced.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An electronic ticket management system, comprising:
   a vendor module to allow business owners to manage and register information of electronic tickets;
   a ticket process module to generate newly added related data and electronic ticket content according to the information of the vendor module in a total database;
   a Web module to allow the business owners to perform service register and management of the electronic tickets through a network, and allow consumers to perform register, order and management of the electronic tickets through the network;
   a ticket order module to receive information of the Web module, and through the ticket process module to generate and store preset electronic ticket content and bar code graphics in the total database;
   a delivery module which is connected to the total database through the ticket process module and sends the electronic ticket content and the bar code graphics through a telecommunication service center to designated devices that have graphic display capability; and
   a ticket verification module to perform identification process of the electronic ticket content on mobile communication devices at a ticket verification end and perform online certification of identification result with the total database;
   wherein the delivery module sends a reminding message through the telecommunication service center to the mobile communication devices designated by the consumers for the certified electronic tickets to prevent the electronic tickets from being replicated;
   wherein the devices that have graphic display capability are the mobile communication devices and computer display devices;
   wherein the consumers identify and capture the bar code graphics on a Web page of the display devices through an image capturing means included in the mobile communication devices;
   wherein the consumers perform physical online transmission through the mobile communication devices and computers.

2. The electronic ticket management system of claim 1, wherein the vendor module includes executing confirmation of account numbers and passwords of the business owners and permits the business owners to perform the register and management after the confirmation is valid.

3. The electronic ticket management system of claim 1, wherein the bar code graphics are selectively two-dimension bar codes or three-dimension bar codes.

4. The electronic ticket management system of claim 1, wherein the Web module includes at least activity information, activity period, ticket number, and bulletin board Website links registered by the business owners.

5. The electronic ticket management system of claim 4, wherein the Web module provides content of chosen charged electronic tickets required by the consumers only after verification of payment account numbers and passwords is valid.

6. The electronic ticket management system of claim 1, wherein the ticket verification module captures the bar code graphics on the mobile communication devices through a scanner at the ticket verification end, the identified content being verified online with the total database to check validity.

7. The electronic ticket management system of claim 6, wherein the scanner further is connected to a decryption input device to prevent the electronic tickets from being replicated and pilfered.

8. The electronic ticket management system of claim 6, wherein the ticket verification end includes a sub-database to exchange data required at the ticket verification end with the total database so that the verification of validity is performed locally when the scanner has captured the bar code graphics on the mobile communication devices.

9. The electronic ticket management system of claim 8, wherein the scanner further is connected to a decryption input device to prevent the electronic tickets from being replicated and pilfered.

* * * * *